Sept. 25, 1934.  A. SCHEIDHAUER  1,974,513
AUTOMATIC FEED WELDING AND FUSION CUTTING MACHINE
Filed March 11, 1933  4 Sheets-Sheet 1

INVENTOR
Alfred Scheidhauer

INVENTOR

Patented Sept. 25, 1934

1,974,513

UNITED STATES PATENT OFFICE 1,974,513

AUTOMATIC FEED WELDING AND FUSION CUTTING MACHINE

Alfred Scheidhauer, Frankfort-on-the-Main, Germany, assignor to Ludwig Markmiller, Frankfort-on-the-Main, Germany Application March 11, 1933, Serial No. 660,426
In Germany March 11, 1932

3 Claims. (Cl. 266—23)

All automatic feed welding or fusion cutting machines with burners movable longitudinally, transversely and in a circle are open to objections which render it impossible to economically use such machines for many kinds of work. This applies chiefly to machines which, although having a longitudinal, transverse and circular guiding mechanism, are incapable of being moved in one direction directly after a movement in another direction without interrupting the work. Moreover, the known machines are incapable of cutting in a direction which is not at right angles to the preceding cut. When such instances arise, it is necessary to interrupt the work, shift and readjust the machine or the work piece, or to fit an auxiliary device with which it is possible to continue the work in the desired direction. Machines are likewise known, which enable work to be carried out successively in different directions, but such machines are driven by a motor which necessitates the employment of complicated and delicate gearings. A great disadvantage arises in such machines when changing over from a straight to a circular movement, because the feed speed changes with the alteration of direction. It has hitherto been endeavoured to counteract this disadvantage by exchanging the gear wheels or by additional gearings. An absolutely uniform feed could, however, not be attained by these means; the main gearing of the machine has to be readjusted after introducing the fresh movement in the event of too great differences in the feed speed. This is a great objection because, particularly when welding or fusion cutting, it is necessary to concentrate one's attention on the operation which is only possible when as few as possible secondary circumstances have to be watched at the same time.

The known machines are open to further objections in that elements are incorporated therein which, although they have proved satisfactory in general machine tool construction, cannot be regarded as the ideal solution in connection with welding and fusion cutting machines. Thus, for example, the change of direction or the introduction of a fresh kind of movement of the burner is effected by toothed or friction clutches, and in many cases even by the direct shifting of toothed wheels. The objections resulting therefrom are the slipping of the clutch or the knocking together of teeth and claws. The inevitable result thereof is a temporary stopping of the burner. This must, however, be avoided because otherwise serious damage to the work-piece may occur. All these objections inherent in the known machines are overcome by the invention in that, in a machine with burner movable in longitudinal, transverse and circular direction a separate control and source of power adjustable in speed are provided for each individual kind of movement. Machines are also known in which every single one of these kinds of movement is effected by a separate motor. In these machines a suspension column carrying the cross slide is rotated by means of a separate motor for moving the burner in a circle, a common separate motor being provided for the longitudinal and transverse movements. Generally speaking, it is possible with this machine to change over from a straight movement into a circular movement but not independently of the straight movement.

In another known machine two straight guides are arranged at an angle mutually adjustable, and a separate motor is provided for each of these guides. In these machines the inclination of the two guides must first be adjusted; cuts other than at the angle set by the guides cannot be carried out without interrupting the cut and effecting a fresh adjustment.

An embodiment of the invention is illustrated by way of example in the accompanying drawings in which:—

Figure 1:
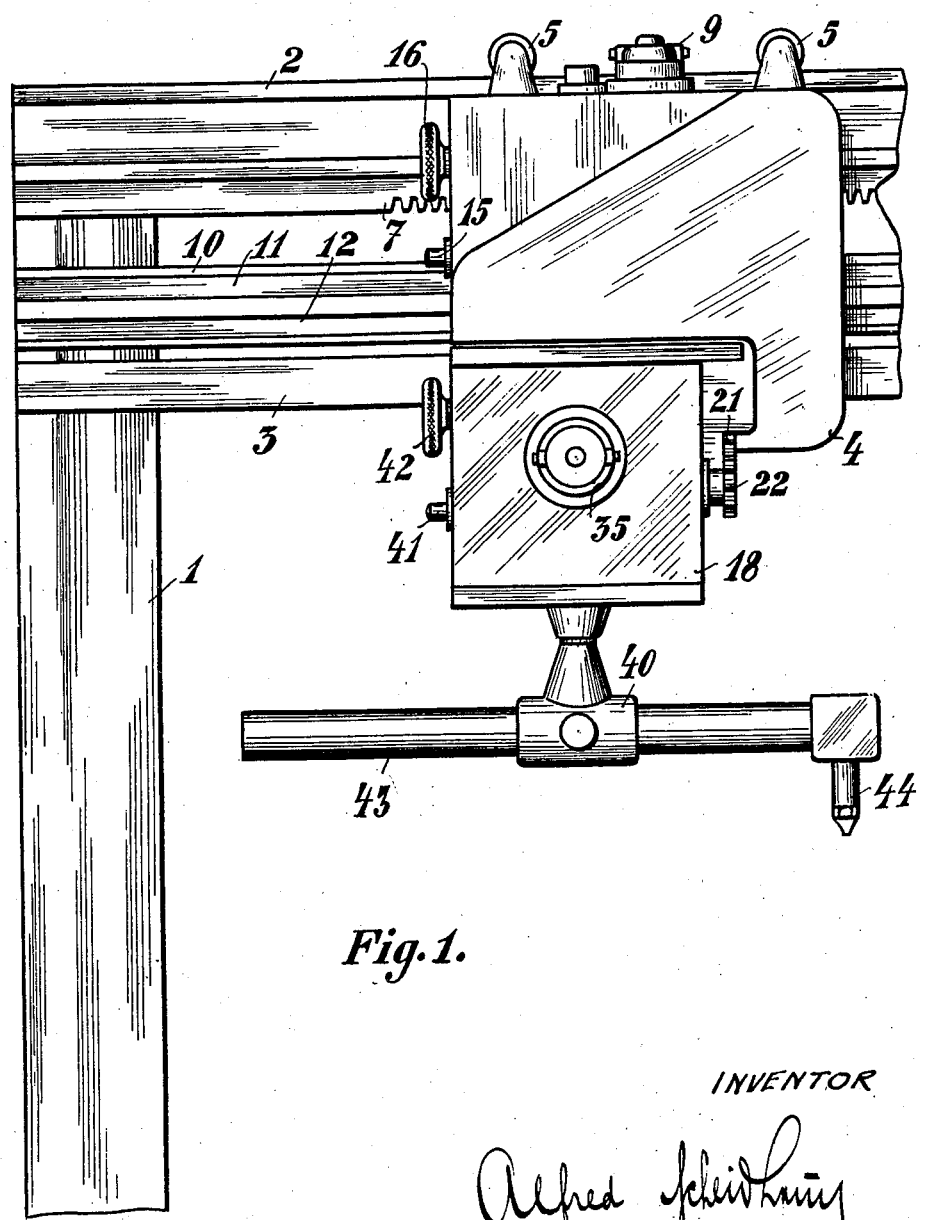
Fig. 1 shows the machine in part front elevation.
Figure 2:
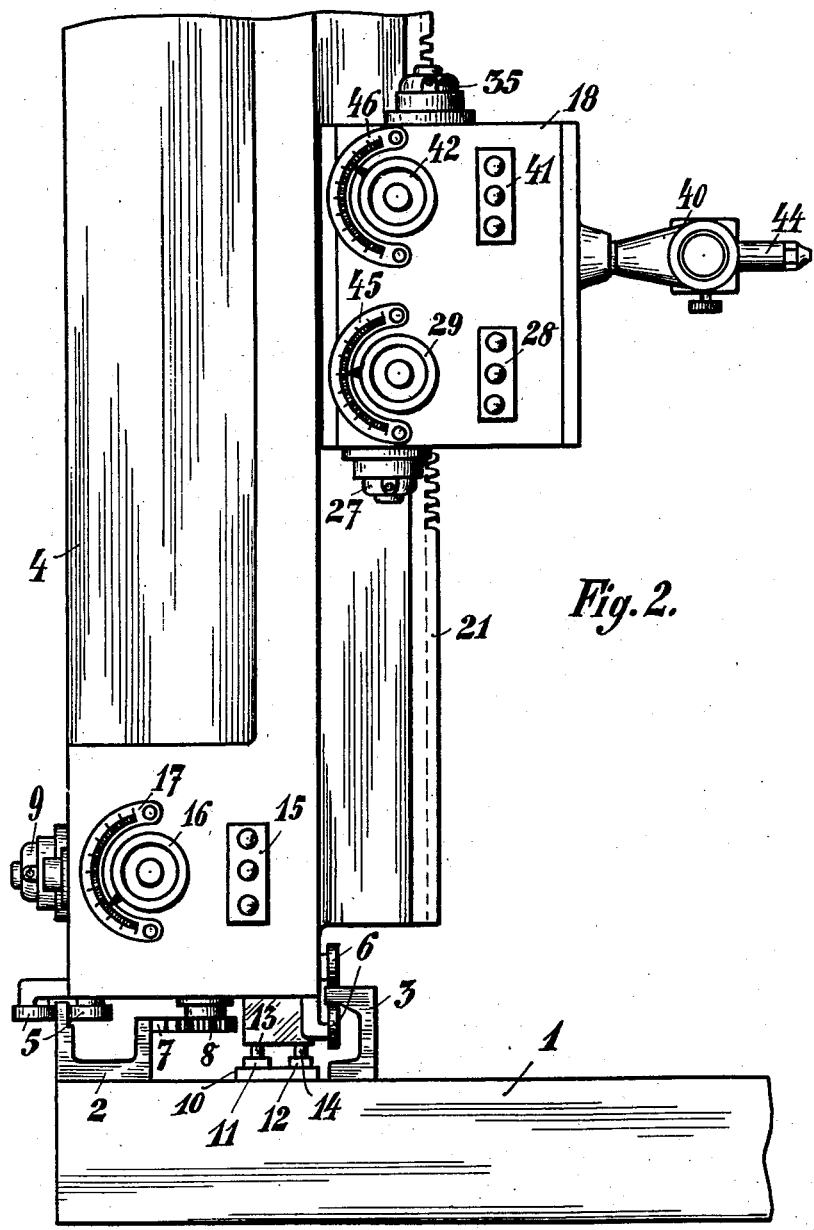
Fig. 2 is a part side elevation of Fig. 1.
Figure 3:
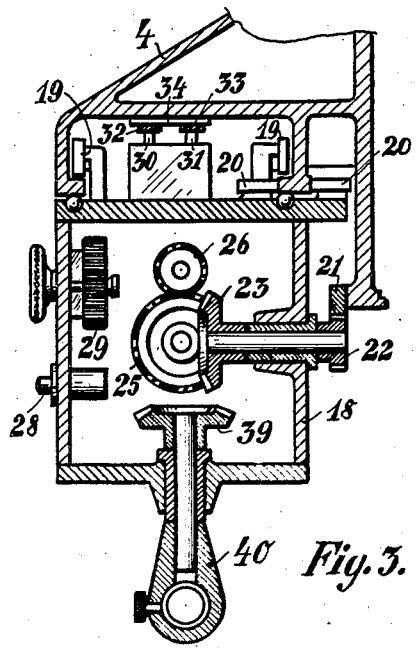
Fig. 3 is a vertical section through the machine arm and the carriage.
Figure 4:
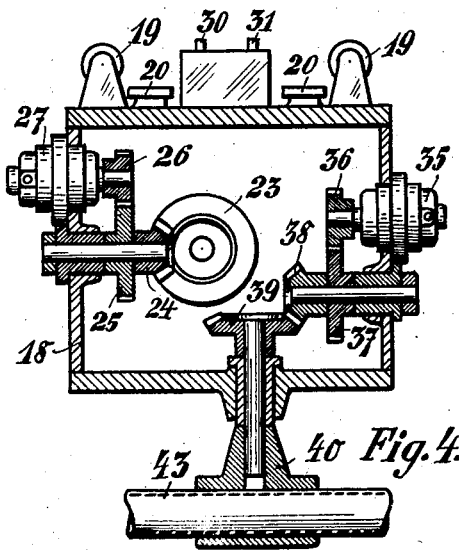
Fig. 4 shows another vertical section through the carriage.
Figure 5:
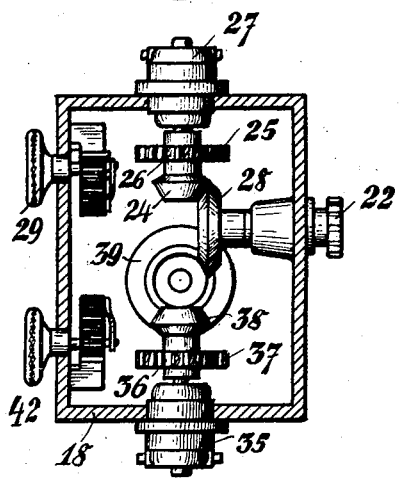
Fig. 5 is a horizontal section through the carriage.
Figure 6:
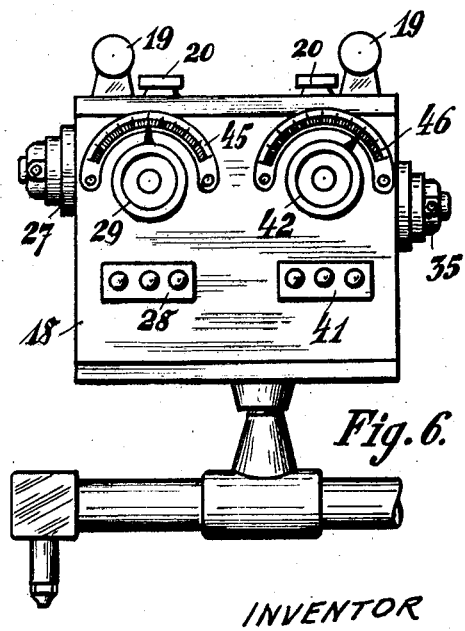
Fig. 6 shows the carriage in front elevation.

U-shaped bars 2, 3 are fixed on uprights 1. The uprights 1 and bars 2, 3 form a track for a transverse arm 4. Rollers 5, 6 mounted on the transverse arm 4 serve for guiding the arm on the bars 2, 3. A rack 7 is fitted on the bar 2 and a spur wheel 8 mounted on the transverse arm 4 meshes with the rack 7. The spur wheel 8 is driven by a motor 9. The drive is the same as in the carriage hereinafter described. Current supply bars 11, 12 are fitted on an insulating layer 10 parallel to the bar 2. The current is supplied over slide contacts 13, 14 to a press button switch 15 and thence over a variable resistance 16 to the motor 9. The middle press button of the switch 15 serves for switching out the current feed, one of the two outer press buttons closes the circuit for rotating the motor 9 in clockwise direction and the other for rotating the motor in anti-clockwise direction. The circuit arrangement is known and therefore not described in detail. The running speed of the motor is varied in known manner by the resistance 16 and indicated on a scale 17. If the motor 9 is switched in, the spur wheel rolls on the rack 7 and shifts the transverse arm 4 along the bar 2. The transverse arm is constructed as track for a carriage 18 carrying the burner (Fig. 3). The carriage 18 is guided on the transverse arm 4 by means of rollers 19, 20. A spur wheel 22 mounted on the carriage 18 engages in a rack 21 fixed on the transverse arm 4, and is driven by a motor 27 through the intermediary of bevel wheels 23, 24 and spur wheels 25, 26. The motor is controlled by a press button switch 28 and its running speed regulated by a resistance 29. The carriage 18 is moved along the transverse arm 4 by the spur wheel 22 rolling on the rack 21. A motor 35 rotates a bearing 40 through the intermediary of spur wheels 36, 37 and bevel wheels 38, 39. A press button switch 41 serves for controlling the motor 35 and a resistance 42 for varying its speed. The current for the motors 27, 35 is derived from current feed bars 32, 33 fixed on an insulating layer in the transverse arm 4 through the intermediary of sliding contacts 30, 31. A scale 45 indicates the speed at which the carriage 18 is fed, whereas the scale 46 indicates the individual circular speeds. A tube 43 carrying a burner 44 is arranged in a bearing 40. The desired diameter can be adjusted in known manner by shifting the tube 43 in the bearing 40.

Figure 7:
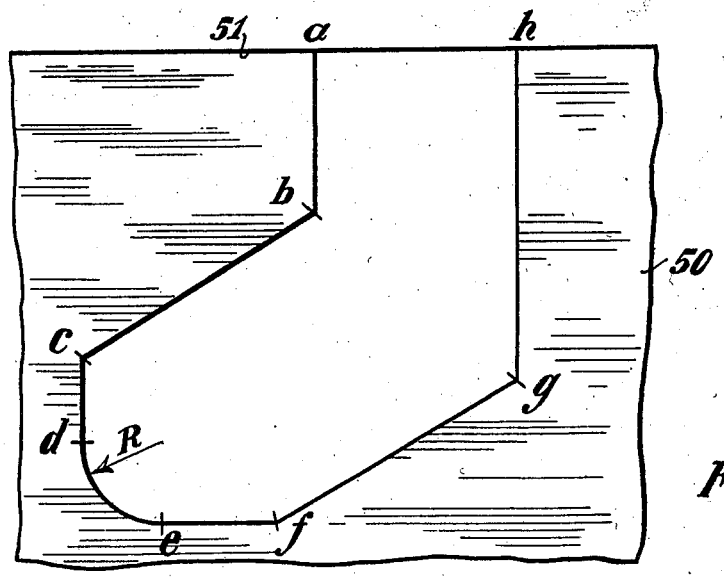
Figs. 7 and 8 are examples of cuts carried out by the machine.

Fig. 7 shows a shape of cut which occurs in all iron and steel works either in the form of joint plates or in the form of apertures in girders or frames. Such shapes could hitherto only be cut in one operation with the above mentioned known machines by employing templates. It is hereinafter shown how these shapes can be produced with the machine according to the invention by controlling the different kinds of movement and their combination with different speeds.

It is desired to cut the shape $a$—$h$ (Fig. 7) from an iron plate 50. The work-piece is placed with its edge 51 adjacent the machine parallel to the bars 2, 3. The cutting is commenced at $a$ by depressing the right press button of the switch 28, it being assumed that the right press button effects the clockwise rotation and the left press button the anti-clockwise rotation of the motor 27. The carriage 18 travels towards $b$. When the carriage reaches the point $b$ the left hand press button of the switch 15 is depressed, whereupon the transverse arm 4 moves towards the left on the bars 2, 3. Consequently, both the arm 4 and the carriage 18 now run together. The speed of the motor 9 must be slightly higher than that of the motor 27. These motor speeds are evidently dependent upon the thickness of the work-piece to be worked and upon the relationship of the two perpendicular sides which result if the line of cut produced by employing the two motors 9, 27 is regarded as hypotenuse. The relationship of the motor speeds must therefore correspond to the relationship of the perpendicular sides. The speeds necessary for the individual angles can be noted on a table. When the burner reaches the point $c$, the middle press button of the switch 15 is depressed, thereby stopping the motor 9, whereas the motor 27 drives the carriage 18 from $c$ to $d$. Shortly before the burner reaches the point $d$, the motor 35 is switched in by actuating the switch 41 and immediately thereafter the motor 27 is stopped by actuating the switch 28. This control is necessary in order to prevent the burner from stopping and damaging the work-piece. Consequently, all movements are controlled independently so that it is possible to first switch in a new movement before stopping the preceding movement. The burner is guided in a curve from $d$ to $e$ by the motor 35. The radius of this curve must evidently be adjusted before commencing the cut by correspondingly shifting the tube 43 in the bearing 4. Shortly before the point $e$ is reached, the right press button of the switch 15 is depressed and immediately thereafter the motor 35 is stopped by means of the switch 41. The motor 9 which is again switched in moves the transverse arm 4 together with the carriage 18 and the burner along the bars 2, 3 from $e$ to $f$. On reaching the point $f$ the left press button of the switch 28 is depressed and, besides the movement along the bars 2, 3 produced by the motor 9, the carriage 18 is moved along the transverse arm 4 by the motor 27. In this instance the movement $f$—$g$ is parallel to the already cut line $b$—$c$ and consequently the speeds for the motors 9, 27 adjusted for this line can be retained. It is also possible to produce another angle, only in this instance the speeds must be correspondingly differently adjusted, which must evidently be effected before reversing the motor 27 by adjusting the resistance 29. The speed of the motor 9 must therefore also be correspondingly adjusted during the movement along the line $e$—$f$ shortly before the point $f$ is reached. On reaching the point $g$ the motor 9 is stopped by means of the switch 15; the burner is now driven by the motor 27 and moves from $g$ to $h$. The cut $a$—$h$ illustrated in Fig. 7 is thereby terminated.

Figure 8:
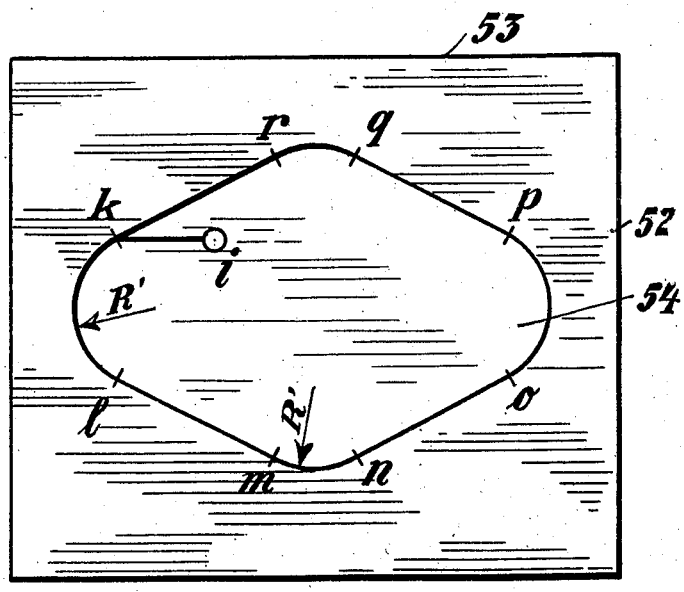

Fig. 8 shows a flange-shaped aperture to be cut in an iron plate 52. The edge 53 is again preferably arranged parallel to the bars 2, 3. The cut is commenced from a hole $i$ in the section 54, after the adjustment of the radius $R'$. By depressing the left press button of the switch 15, the burner first moves from $i$ to $k$. At this point the circular movement is engaged by means of the switch 41 and then the middle button of the switch 15 is actuated. Shortly before $l$ the right press buttons of the switches 15, 28 are depressed and then the middle button of the switch 41. The speeds of the two switched in motors 9, 27 are first mutually adjusted in the manner described in connection with the cut illustrated in Fig. 7. The burner now moves from $l$ to $m$. Shortly before it reaches the point $m$, the circular movement is engaged by means of the switch 41 and directly thereafter the middle press buttons of the switches 15, 28 are depressed and the burner describes the arc from $m$ to $n$. At $n$ the right press button of the switch 15 and the left press button of the switch 28 are depressed and the circular movement again stopped by the switch 41. The burner moves from $n$ to $o$ where the circular movement is switched in by the switch 41 before being stopped by means of the switches 15, 28 and thus carries out the movement from $o$ to $p$. The left press buttons of the switches 15, 28 are then actuated and the circular movement stopped by the switch 41. The burner runs in the direction $p$—$q$. At $q$ the circular movement is again engaged by means of the switch 41. The burner runs from $r$ to $k$ and inner section 54 drops out. It is evident that the burner must be shut off before stopping the movements.

The possibilities of producing cuts in all kinds of parts composed of straight lines in different direction and with curves extending therefrom are innumerable. In the case of large bulky work-pieces it may happen that the operator can no longer reach the switch 15 and the resistance 16. This difficulty can be overcome by accommodating both these elements in the carriage 18 and supplying the current by sliding contacts similar to the contacts 30, 31 and correspondingly arranged contact bars similar to the bars 32, 33. Before beginning work, the operator can adjust the necessary speeds so that he need not worry about these during the whole work. Owing to the lack of clutch and toothed wheel switches the irregular feeding caused by these elements is avoided. The possibility of allowing the individual movements to be carried out at different speeds and directly following one another presents considerable advantages over the known machines.

I claim:—

1. An automatic feed welding or fusion cutting machine with burner movable in longitudinal, transverse and circular directions, in which each individual kind of movement is controllable and adjustable, comprising in combination with the means for effecting the different kinds of movements, separate adjustable sources of power one for each of said means, and separate controlling means, one for each of said sources of power.

2. An automatic feed welding or fusion cutting machine with burner movable in longitudinal, transverse and circular directions, in which each individual kind of movement is controllable and adjustable, comprising in combination with the means for effecting the different kinds of movements, adjustable motors, one for each of said means, and press button control switches one for each of said motors.

3. An automatic feed welding or fusion cutting machine with burner movable in longitudinal, transverse and circular directions, in which each individual kind of movement is controllable and adjustable, comprising in combination with the means for effecting the different kinds of movements, adjustable motors one for each of said means, press button control switches one for each of said motors, and speed indicating devices one for each of said motors.

ALFRED SCHEIDHAUER.